(12) United States Patent
Cho et al.

(10) Patent No.: US 11,861,035 B2
(45) Date of Patent: Jan. 2, 2024

(54) SEPARATING PUBLIC AND PRIVATE KNOWLEDGE IN AI

(71) Applicant: INTERNATIONAL BUSINESS MACHINES CORPORATION, Armonk, NY (US)

(72) Inventors: Minsik Cho, Austin, TX (US); Bumsoo Kang, Daejeon (KR); Chungkuk Yoo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 16/414,087

(22) Filed: May 16, 2019

(65) Prior Publication Data

US 2020/0364541 A1    Nov. 19, 2020

(51) Int. Cl.
| | | |
|---|---|---|
| *G06F 21/62* | (2013.01) | |
| *G06N 3/08* | (2023.01) | |
| *G06N 3/045* | (2023.01) | |
| *G06V 10/82* | (2022.01) | |
| *G06V 10/44* | (2022.01) | |
| *G06V 20/52* | (2022.01) | |

(52) U.S. Cl.
CPC ......... *G06F 21/6245* (2013.01); *G06N 3/045* (2023.01); *G06N 3/08* (2013.01); *G06V 10/454* (2022.01); *G06V 10/82* (2022.01); *G06V 20/52* (2022.01)

(58) Field of Classification Search
CPC .......................... G06N 3/0454; G06F 21/6245
See application file for complete search history.

(56) References Cited

U.S. PATENT DOCUMENTS

| | | | | |
|---|---|---|---|---|
| 9,792,492 | B2 * | 10/2017 | Soldevila | ............... G06V 10/75 |
| 10,748,063 | B2 * | 8/2020 | Jammalamadaka | ..... G06N 3/08 |
| 2018/0089592 | A1 | 3/2018 | Zeiler | |
| 2018/0307979 | A1 | 10/2018 | Selinger | |
| 2019/0042878 | A1 | 2/2019 | Sheller | |
| 2019/0251433 | A1 * | 8/2019 | Lin | ....................... G06N 3/0454 |
| 2020/0134442 | A1 * | 4/2020 | Sim | .................. G06Q 10/06311 |
| 2020/0311273 | A1 * | 10/2020 | Knox | ....................... G06F 21/57 |
| 2020/0311616 | A1 * | 10/2020 | Rajkumar | .............. G06N 5/043 |

FOREIGN PATENT DOCUMENTS

CN          111950724 A      11/2020

OTHER PUBLICATIONS

Manning, "Artificial Intelligence Definitions", Stanford University, Sep. 2020 (Year: 2020).*

* cited by examiner

*Primary Examiner* — Scott C Anderson
(74) *Attorney, Agent, or Firm* — Gilbert Harmon, Jr.

(57) ABSTRACT

A computer-implemented method comprises linking a private AI model to a public AI model to thereby form a combined AI model comprising the private AI model and the public AI model; and training the combined AI model with private samples while keeping the public AI model fixed so that only the private AI model is trained with the private samples.

20 Claims, 10 Drawing Sheets

SEPARATING PUBLIC AND PRIVATE KNOWLEDGE IN AI

BACKGROUND

The present invention relates to separating public and private knowledge in artificial intelligence (AI).

SUMMARY

According to an embodiment of the present invention, the present invention provides a computer-implemented method comprising: linking a private AI model to a public AI model to thereby form a combined AI model comprising the private AI model and the public AI model; and training the combined AI model with private samples while keeping the public AI model fixed so that only the private AI model is trained with the private samples. Other embodiments of the present invention include a computer program product comprising a computer readable storage medium having program instructions embodied therewith, the program instructions executable by one or more processors to cause the one or more processors to perform the computer-implemented method and a system for implementing the above-described computer-implemented method.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
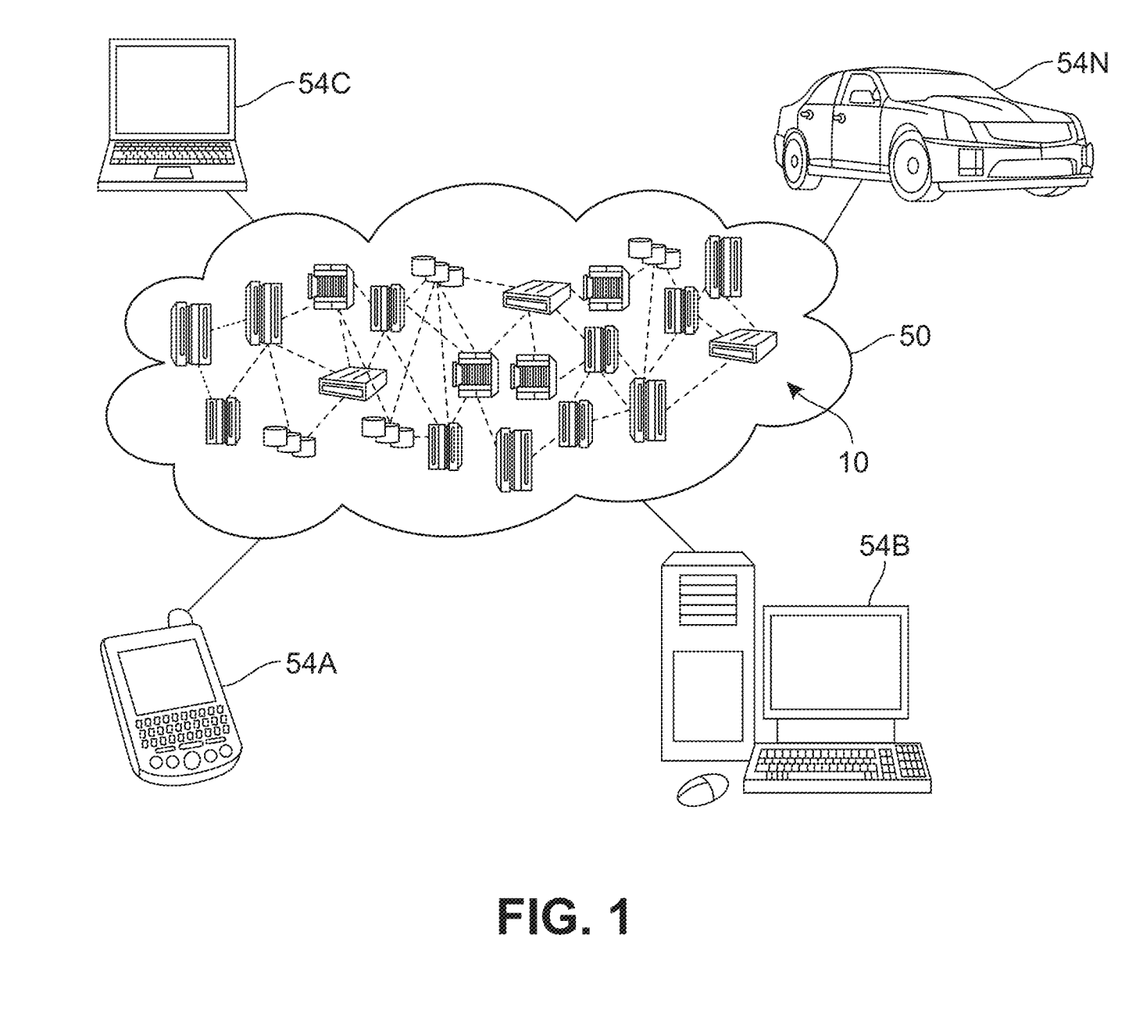
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
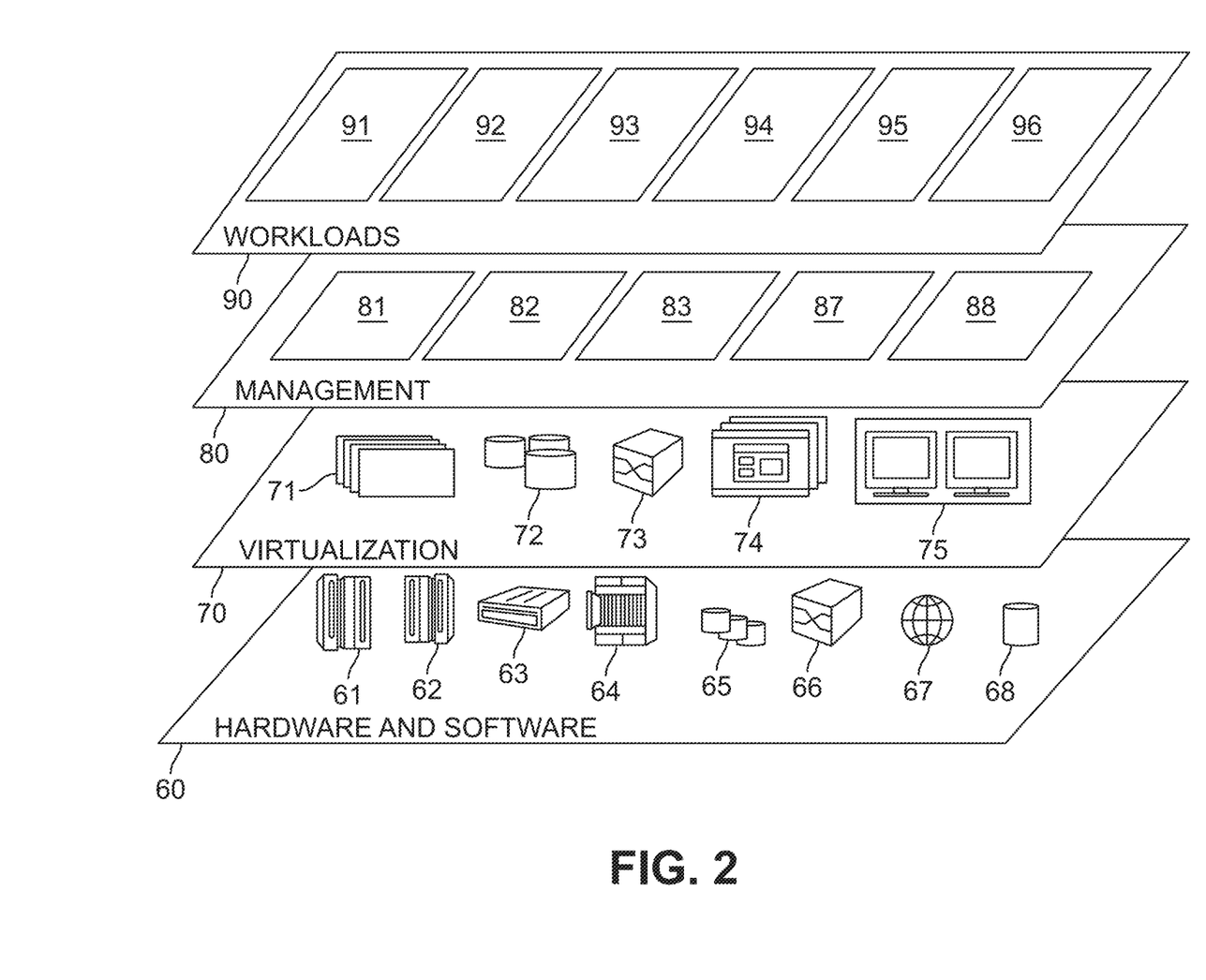
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and building an artificial intelligence model 96.

A public AI model is an AI model that is trained with public data only. A private AI model is a model trained with a mix of public and private data. A common technique for improving both public and private AI models is transfer learning which involves fine-tuning a pre-trained model through weighting updates.

Common issues that face a user of private AI model is that a user's private AI model may not have enough samples in the private AI model and the turnaround time in the private AI model may be slow because the user does not have the computer power available to a public AI model which is accessed by many users. To overcome these issues a user may try to fine tune user's private AI model with someone else's public AI model using transfer-learning. In order to train the user's private AI model with the public AI model, the user may download the public AI model, keep only the feature extraction parts of the public, add the FC layers of the private AI model and tune the entire combined neural network for better accuracy.

Problems with existing ways of fine-tuning public and private AI models with transfer learning, there are unverifiable original models, too many derived or transferred models with a resulting inference overhead, and there is no way to preserve privacy of the data in the user's private AI model. In conventional methods of transfer learning between a public AI model and a private AI model, a user's private AI model is not only fine-tuned by the public model but the public AI model is fine-tuned with the user's private AI model. However, while a private model fine-tuned with public data from a public AI remains private, a public AI model which is tuned with private data from a private AI model becomes a private AI model, due to the presence of the private data in the previously public AI model.

Figure 3:
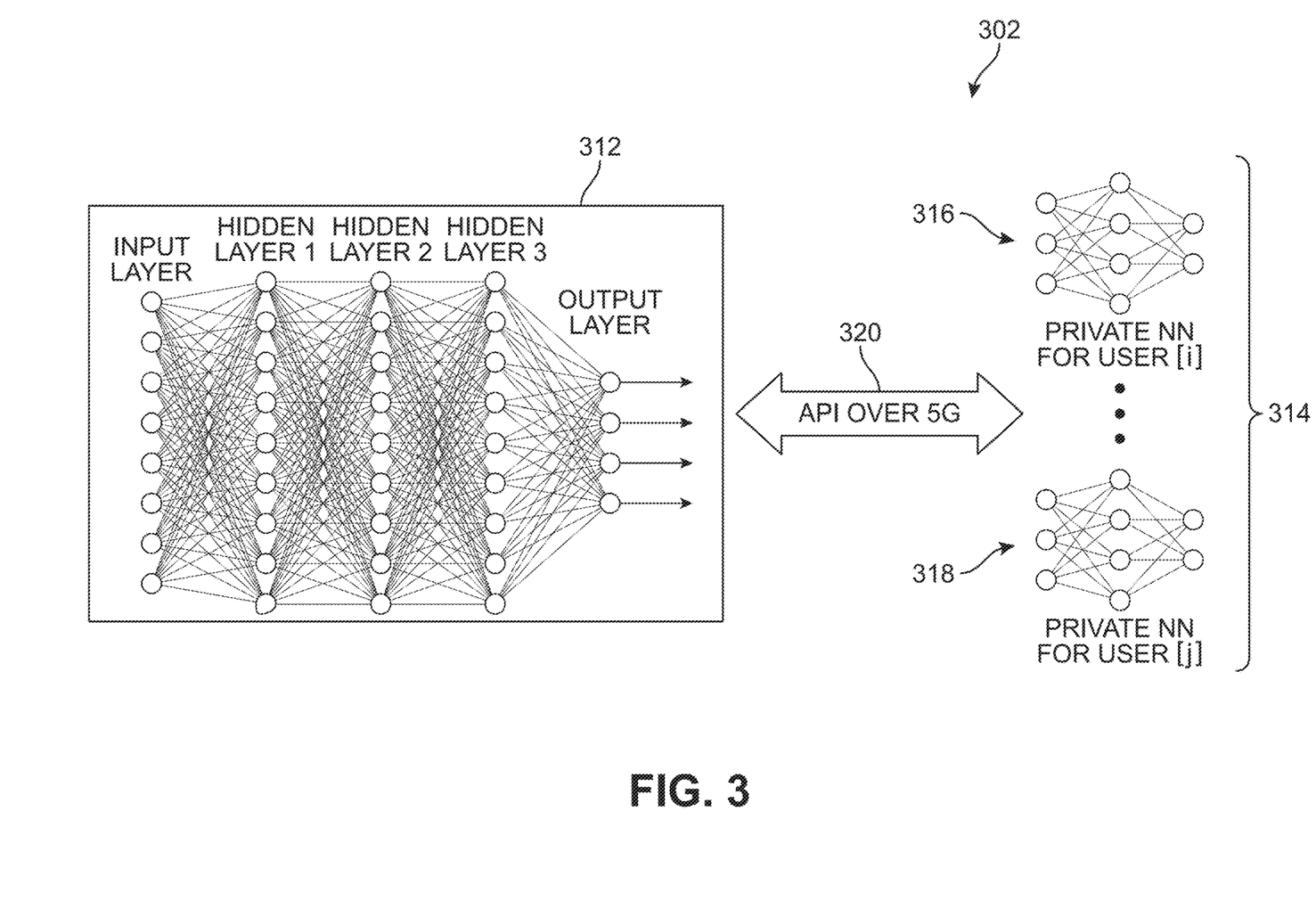
FIG. 3 is a diagram depicting a public neural network (NN) in communication and interacting with a number of private NNs in a combined private according to an embodiment of the present invention and illustrating a benefit of an embodiment of the present invention.

In an embodiment of the present invention 302 depicted in FIG. 3, in order to prevent the public AI model from becoming a private AI model during transfer learning, the public AI model is kept "fixed", i.e., the public AI model does not change, when a user's private AI model is combined with a public AI model to form a combined AI model and the a user's private AI model is fine-tuned with the public AI model. In the embodiment of the present invention depicted in FIG. 3, a public NN 312 is accessible by many private NNs 314, of which a private NN 316 for user[i] and a private NN 318 for user [j] are shown, interact with public NN 312 over a 5G wireless telecommunication network as shown by double-headed arrow 320. Public NN 312 is a large, full-size, public NN for everyone and contains public knowledge. Private NNs 316 are small and contain private knowledge. Public NN 312 runs on a public environment (env) such as a public cloud and maximizes resource sharing, i.e., batch-up to cut down the cost of using public NN 312. Each private NN of private NNs 316 runs on a private environment, such as a mobile phone, private cloud, etc. in which privacy is protected and which is fully tuned for personalization.

Figure 4:
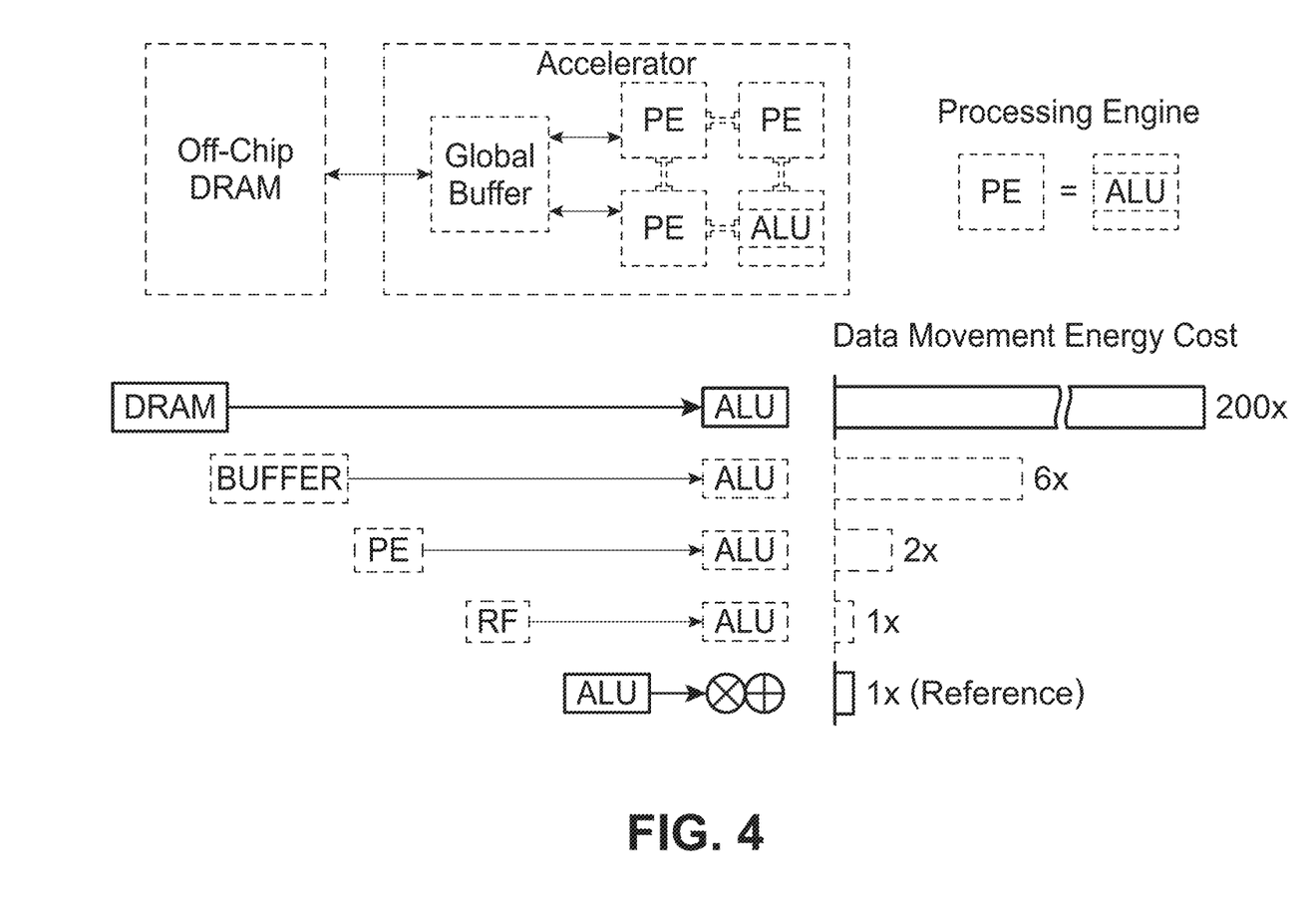
FIG. 4 is a diagram illustrating a benefit of the embodiment of the present invention depicted in FIG. 3.

In addition to the benefit preventing a public AI model from becoming a private AI model, the embodiment of the present invention depicted in FIG. 3 has an additional benefit, as shown in FIG. 4, that the embodiment of the present invention depicted in FIG. 3 is more energy efficient compared to other systems and method of transfer learning involving public AI models and private AI model. Switching model parameters for multiple users/applications, as is done in traditional transfer learning methods, is an energy consuming task. In contrast, fixed and sharable public NN parameters, such as provided in various embodiments of the present invention, such as the embodiment of the present invention shown in FIG. 4 provides energy efficiency.

Figure 5:
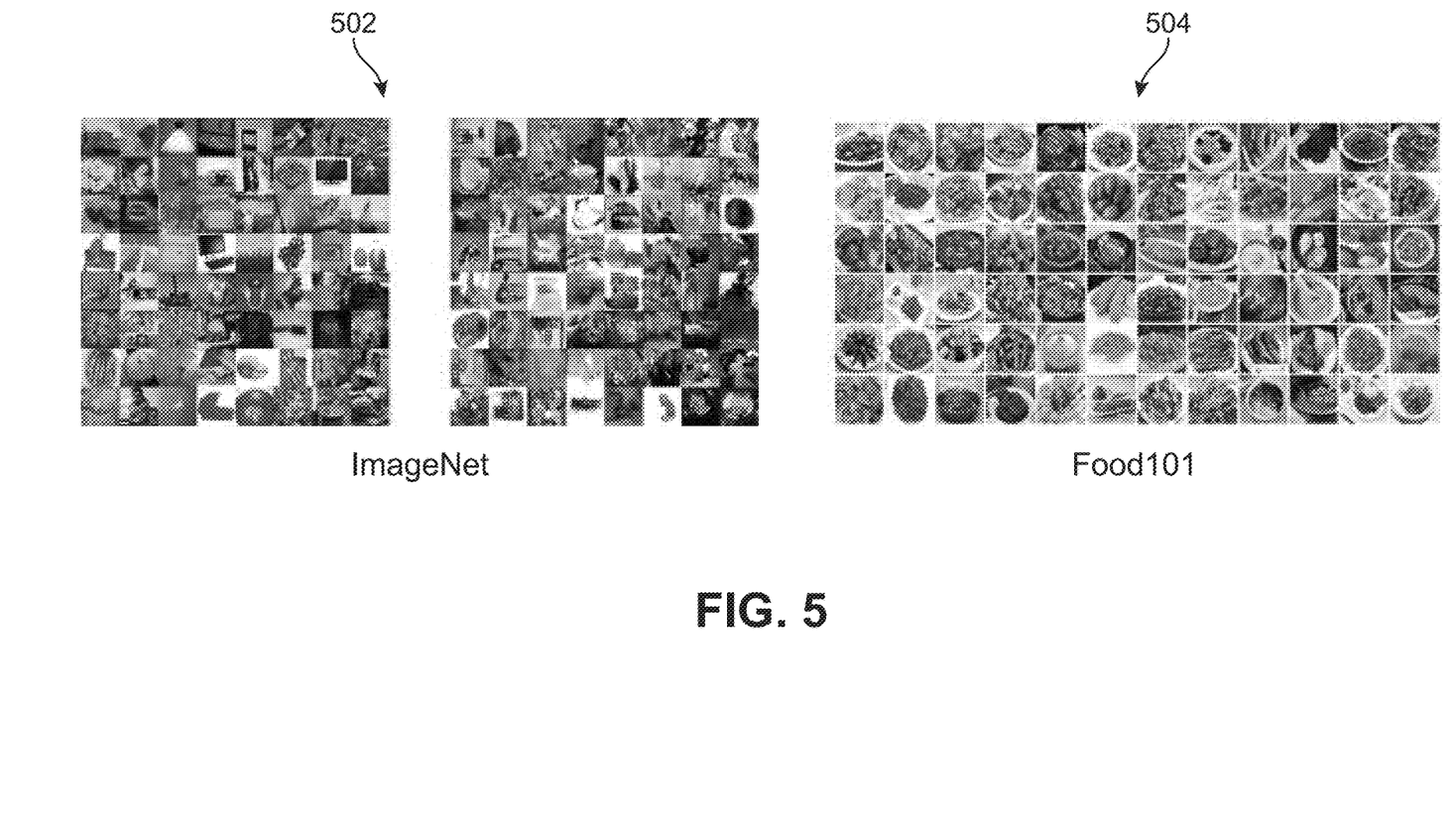
FIG. 5 depicts a public database and a private database used to test the operation of an embodiment of the present invention.

FIG. 5 depicts a public database 502, i.e., ImageNet, and a private database 504, i.e. Food101 used to test the operation of an embodiment of the present invention. Resnet50, a convolutional neural network trained on more than a million images from ImageNet is used as the public AI model. A private AI model is trained on Food101.

Figure 6:
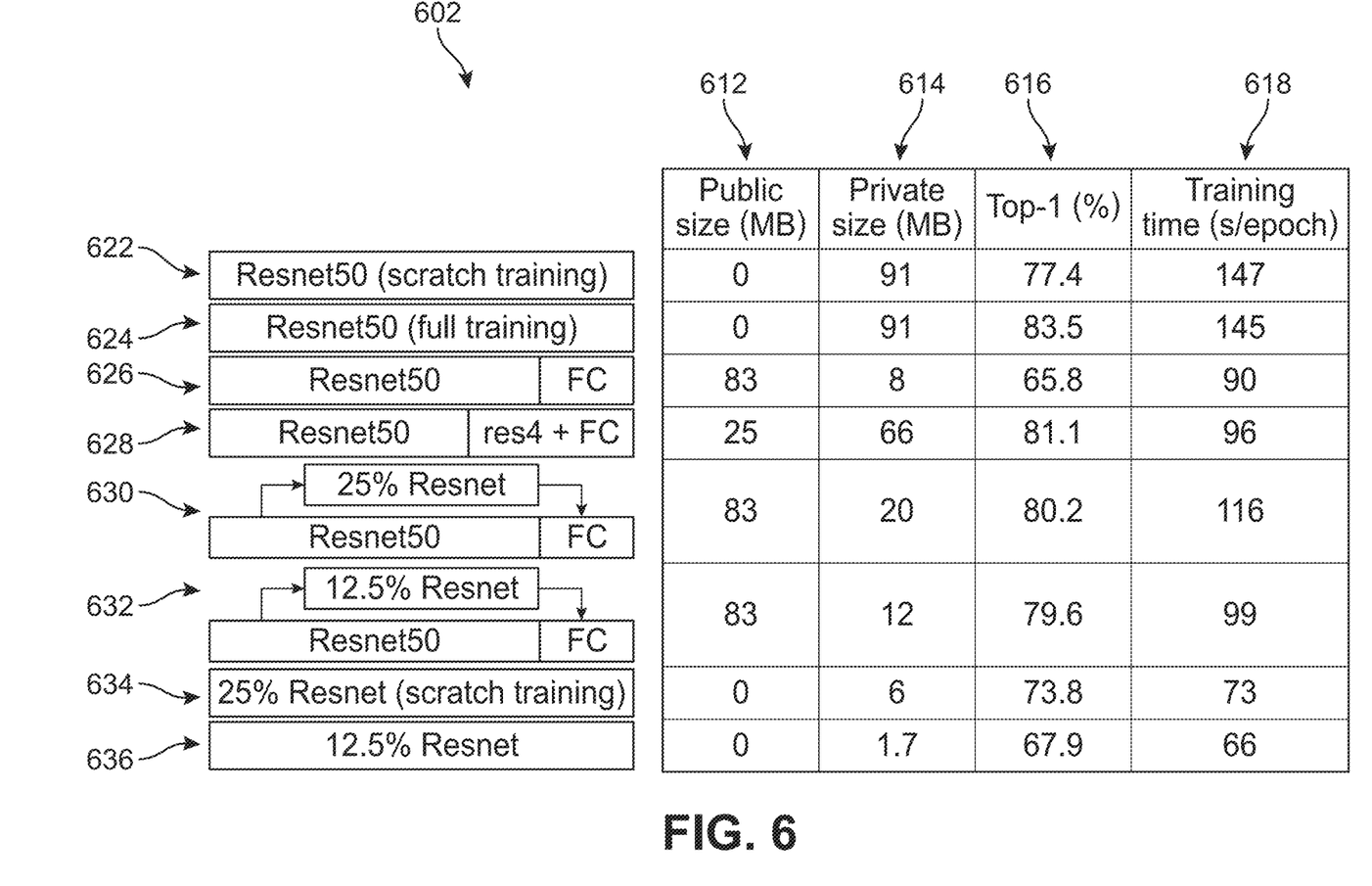
FIG. 6 is a table showing the results of training tests of public AI models using the public database of FIG. 5 and combined AI models using the public database and private database depicted in FIG. 5.

Table 602 of FIG. 6 shows the results of training tests. Column 612 lists the size in megabytes of each of the public AI models used in each test, column 614 lists the size in megabytes of each of the private AI models used in each test, column 616 lists the Top-1 accuracy for each test, and column 618 lists the training time in seconds per epoch for each test. Top-1 accuracy is the conventional accuracy: the model answer (the one with highest probability) must be exactly the expected answer. For the public AI model Resnet50, trainings on Resnet50 alone are treated as if they are tests on a "private AI model" in Table 602 and Resnet50 is not a fixed public AI model. Test 622 involved a scratch training of Resnet50. Test 624 involved a full retraining of Resnet50. Test 626 involved a training according to an embodiment of the present invention of combined AI model comprising Resnet50 and an FC layer of the private AI model trained on Food101 where Resnet50 was fixed during training of the combined AI model. Test 628 involved a training of a combined AI model comprising Resnet50 as a fixed public AI model and a private AI model consisting of a combination of res4, which is part of public model Resnet50, and an FC layer of a private AI model trained on Food101. Test 630 involved a training of a combined AI model comprising Resnet50 as a fixed public AI model and a private AI model consisting of 25% of Resnet50 and an FC layer of a private AI model trained on Food101. Test 632 involved a training of a combined AI model comprising Resnet50 as a fixed public AI model and a private AI model consisting of 12.5% of Resnet50 and an FC layer of a private AI model trained on Food101. Test 634 involved a scratch training of 25% of Resnet50. Test 636 involved a scratch training of 12.5% of Resnet50

As can be seen in Table 602 of FIG. 6, re-training an entire private AI model has an expensive training cost (145 sec/epoch in Test 624). Also, it is expensive to retrain a private model entirely on private servers. Retraining an FC layer of a private model as shown in Test 626 has the advantages of only having to retrain a small AI private model but the private AI model has poor accuracy. Test 632 shows several advantages of a combine AI model according to an embodiment of the present invention in which the private part (private AI model) of the combined AI model on private servers is linked to a fixed public part of the combined AI model which is a large pre-trained public AI model on cheaper public services. Such a combined AI model provides efficient cost management and protects privacy while still maintaining high accuracy.

Figure 7:
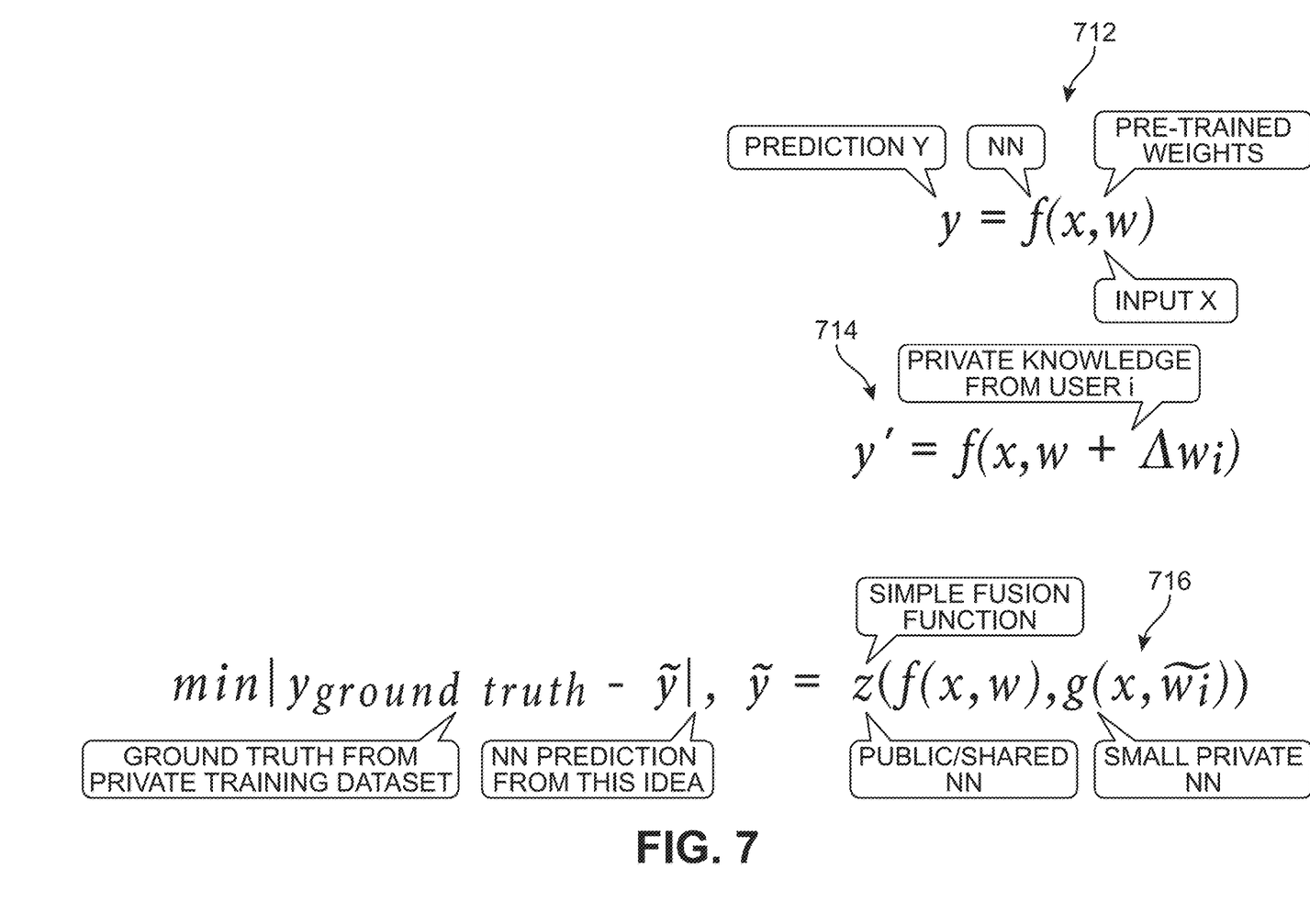
FIG. 7 is a diagram depicting how a public AI model and a private AI model are kept separate from each other in a combined AI model according to an embodiment of the present invention in comparison to the mixing of the public AI model with the private AI model in conventional transfer learning techniques.

FIG. 7 depicts a public AI model and a private AI model are kept separate from each other in a combined AI model according to an embodiment of the present invention in comparison to the mixing of the public AI model with the private AI model in conventional transfer learning techniques. An equation 712 for a function "f" is shown for a pre-trained NN (public AI model). Public knowledge from the public AI model is mixed with private knowledge from private data to produce equation 714 for a function "f" that includes private knowledge from a user i. In contrast, in a combined AI model according to an embodiment of the present invention in which the public AI model and the private AI model are kept separate, produces equation 716 including a fusion function "z" that includes a function "f" for the public AI model and a separate function "g" for the private AI model.

Figure 8:
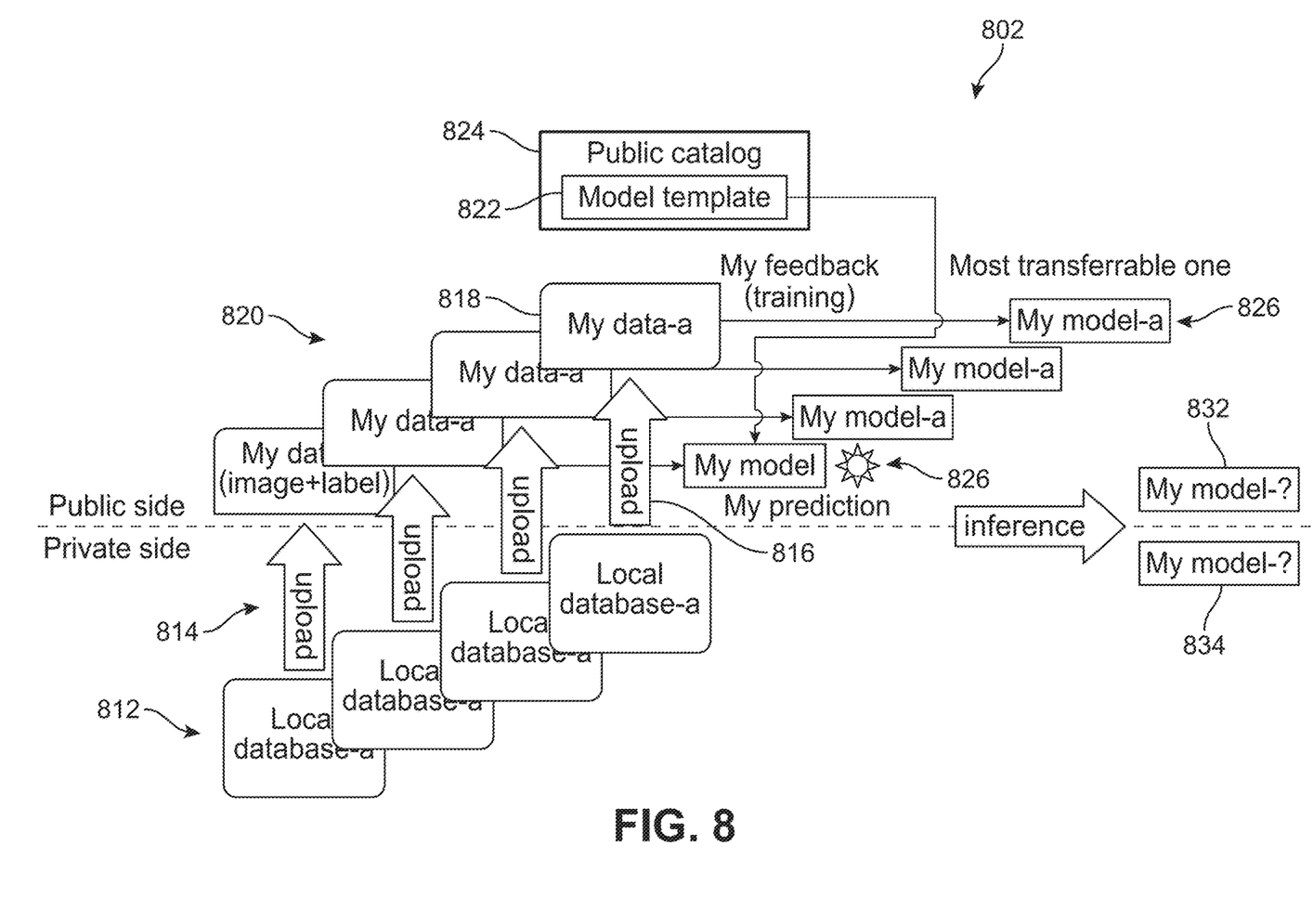
FIG. 8 depicts a conventional transferring learning service in which customers' private local databases are uploaded to public database for training with a public AI model.

FIG. 8 depicts a conventional transfer learning service 802 in which customers' private local databases 812 on a private side 814, such as a private cloud, for each customer, are uploaded as private data 816, as shown by each respective arrow 818 to a public side 820, such as a public cloud. Each customer picks a model template 822 from a public catalog 824 which is trained using the customer's private data 816 to produce a private AI model 826 for the customer that provides a prediction 828 for the customer. Transfer learning service 802 not only produces a private model 832 that can be downloaded by the customer to private side 814 but also produces a private model 834 that remains on remains public side 820.

From a customer standpoint, concerns about such a transfer learning service as depicted in FIG. 8 include: (1) concerns about trusting the service provider of the public AI model, because the customer's private AI model, prediction, labels, etc. remain on the public side, (2) concerns about the cost increasing because the service provider owns everything on the public side and (3) the service provider will know private information about the customers' private AI model including the problem the customer was trying to solve, the number of classes in the customers private AI model, etc.

From a service provider standpoint, concerns about such a transfer learning service as depicted in FIG. 8 include: (1) earning the trust of customers given that the service provider must keep the customer's private information safe, protected, encrypted, etc., and (2) the cost of providing the service increasing over time due to safety/legal overhead, the need for more and bigger data/models and more resources needed to serve higher peak inference requests.

Figure 9:
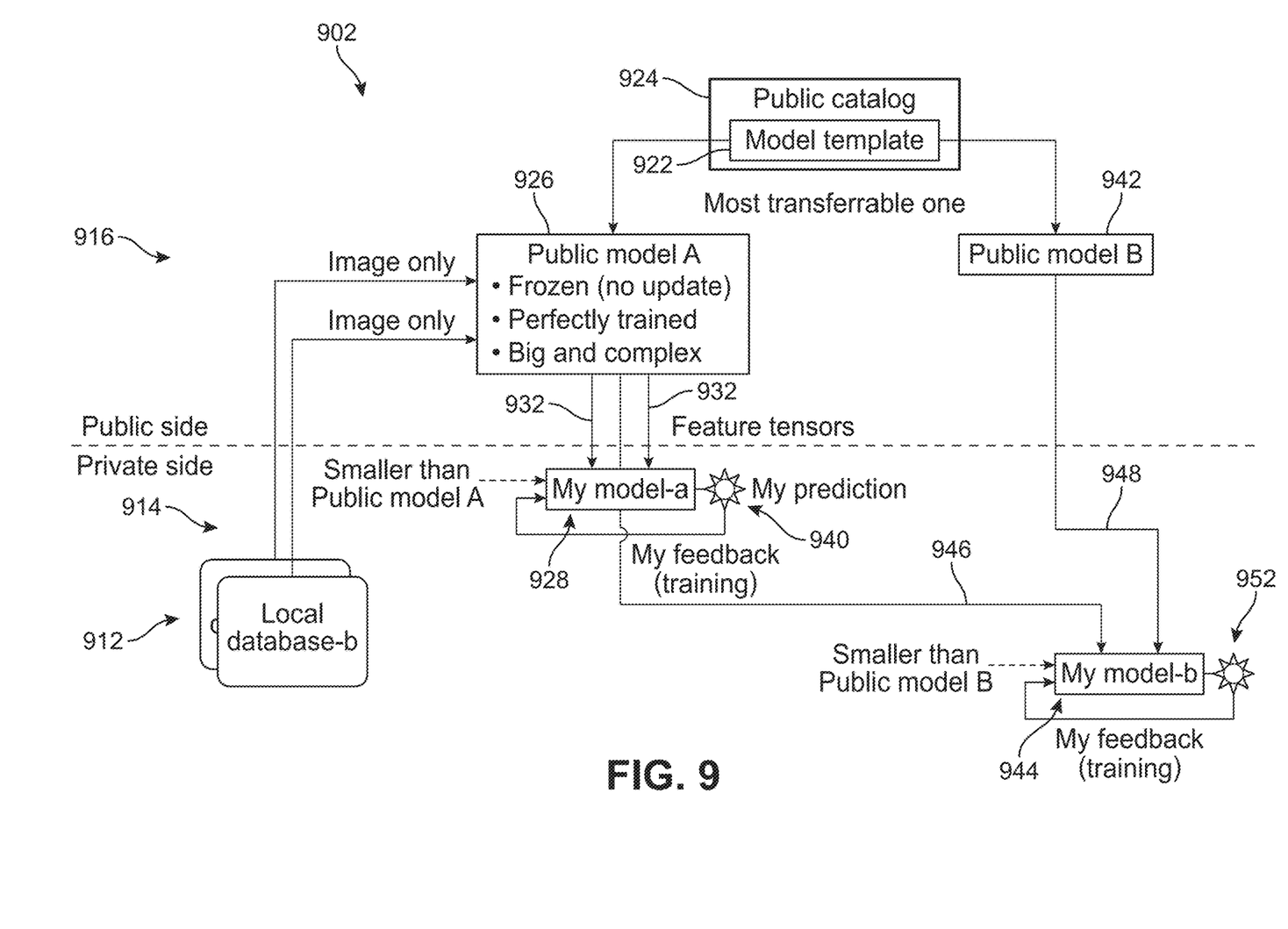
FIG. 9 depicts a transferring learning service in which the public AI model employed is fixed according to an embodiment of the present invention.

FIG. 9 depicts a conventional transfer learning service 902 in which customers' private local databases 912 are located on a private side 914, such as a private cloud, for each customer. Each customer selects a model template 922 from a public catalog 924 on public side 916, such as private cloud, to use as a public AI model 926. Public AI model 926 is "frozen", i.e., fixed, and will not be updated during transfer learning and training of a customer's private AI model 928 during which public AI model 926 is linked to the customer's private AI model 928 as a combined AI model. During training, private AI model 928 is trained using feature tensors 932 of public AI model 926. Feature tensors 932 are features of public AI model 926 used to modify private AI model 928. After being trained, private AI model 928 may be used to make a prediction 940. Because public AI model 926 is kept fixed, while being used to train private AI model 928, public AI model 926 may also be used by itself or in combination with another public AI model, i.e., public AI model 942 from public catalog 924 to train another private AI model 944, which may be owned by the same customer as owns private AI model 928 or by a different customer. As shown in FIG. 9, during training, private AI model 944 is trained using feature tensor 946 of public AI model 926 and feature tensor 948 of public AI model 942, similarly to the way that private AI model 928 is trained using feature tensors 932 of public AI model 926. Once private AI model 944 is trained, private AI model 944 may be used to make a prediction 952.

Each public AI model in the embodiment of the present invention depicted in FIG. 9 is fixed, big, complex and perfectly trained, i.e., each public AI model is trained with a large dataset. Private AI model 928 is smaller than public AI model 926 and private AI model 934 is smaller than public AI model 942.

In an embodiment of the present invention as shown in FIG. 9, the public AI model/model template selected to train a particular private AI model is the "most transferable one", i.e., the public AI model that is most relevant to the private AI model.

Augmenting a customer's private AI model itself for knowledge transfer as shown in FIG. 9 has various advantages including: preventing the updating of weights (unlike in typical transfer learning), enabling inherent model parallelism, i.e., that a fixed public AI model may be used to simultaneously train two or more different private AI model, providing efficient computing at scale and more secure data/model protection.

Figure 10:
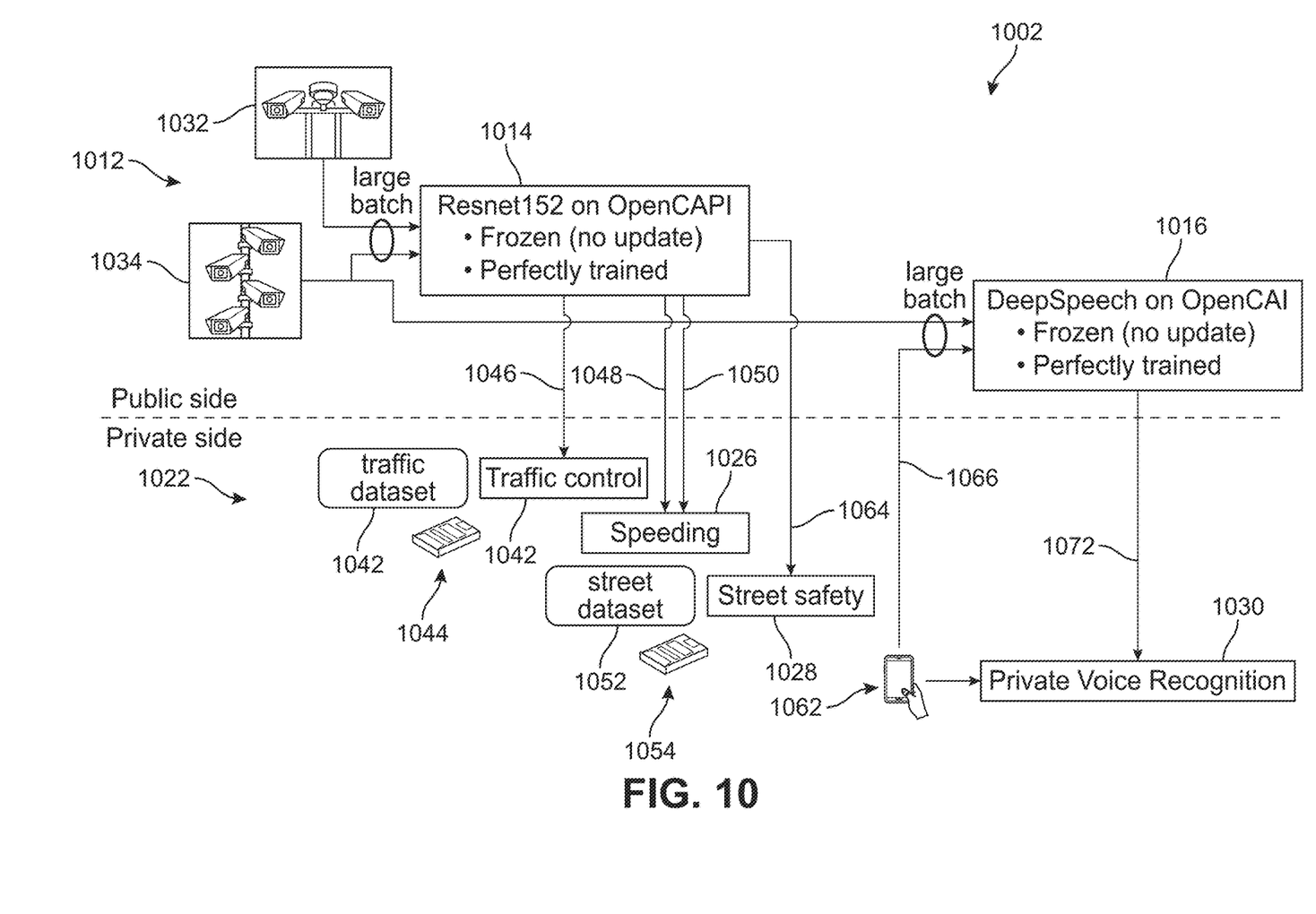
FIG. 10 depicts a usage scenario for an embodiment of the present invention.

FIG. 10 depicts a usage scenario 1002 for an embodiment of the present invention. On a public side 1012 of usage scenario 1002 are a public AI model 1014 and a public AI model 1016, each of which is fixed and perfectly trained. On a private side 1022 are a private AI model 1024, a private AI model 1026, a private AI model 1028 and a private AI model 1030.

Public AI model 1014 is trained with surveillance images from various sources, such as images from a surveillance camera 1032 at a highway and images from a surveillance camera 1034 at a downtown location. Public AI model 1016 is trained with images from various sources, such as images from surveillance camera 1034 at a downtown location and is trained with speech files from various data sets (not shown).

Private AI model 1024 for traffic control is trained using a dataset 1042 of traffic images. Private AI model 1024 and dataset 1042 are stored on an electronic device 1044. In order to improve private AI model 1024, private AI model 1024 may be linked to public AI model 1014 to allow fine-tuning of private AI model 1024 with the early highway feature 1046 of public AI model 1014. Early highway feature 1046 is based on early morning images from one or more highway surveillance cameras, such as surveillance camera 1032.

Private AI model 1026 for speeding, i.e., for determining which vehicles are speeding, is trained using dataset 1042 of traffic images. Private AI model 1026 and dataset 1042 are stored on electronic device 1044. In order to improve private AI model 1026, private AI model 1026 may be linked to public AI model 1014 to allow fine-tuning of private AI model 1026 with early highway feature 1048 of public AI model 1014 and with a late highway feature 1050, of public AI model 1014. Late highway feature 1050 is based on images from late in the day from one or more highway surveillance cameras, such as surveillance camera 1032.

Private AI model 1028 for street safety, i.e., for determining which streets are currently safe, is trained using a dataset 1052 of street images. Private AI model 1028 and dataset 1052 are stored on electronic device 1054. Private AI model 1028 is also stored on a mobile device 1062, such as a smartphone. In order to improve private AI model 1028, private AI model 1028 may be linked to public AI model 1014 to allow fine-tuning of private AI model 1028 with late downtown feature 1064 of public AI model 1014. Late downtown feature 1064 is based on late day images from one or more downtown surveillance cameras, such as surveillance camera 1034. Private AI model 1028 is also linked to public AI model 1016 to fine-tune private AI model 1028 with early downtown feature 1066 of public AI model 1016. Early downtown feature 1066 is based on speech files on messages about the condition of street safety in the early hours downtown.

Private AI model 1030 is for private voice recognition, i.e., for voice recognition of communications received by mobile device 1062 and is stored on mobile device 1062. In order to improve private AI model 1030, private AI model 1030 may be linked to public AI model 1016 to allow fine-tuning of private AI model 1030 with late mobile feature 1072 of public AI model 1016. Late mobile feature 1072 is combination of features to a mobile phone user.

Although public AI models and private AI models trained with particular types of data are described above and shown in the drawings, various embodiments of the present invention may use public AI models and private AI models trained with other types of data including computer vision (image and video) data, language data, text data, speech data, audio data, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
linking, by an AI model training application, a private AI model, to a public pre-trained AI model to thereby form a combined fusion AI model comprising the private AI model and the public pre-trained AI model; and
training, by the AI model training application, the combined fusion AI model with private samples while keeping the public pre-trained AI model fixed so that only the private AI model is trained with the private samples and feature tensor input from the public pre-trained AI model, wherein weights associated with the public AI model are not updated, allowing simultaneous training of a plurality of private AI models.

2. The computer-implemented method of claim 1, wherein linking the private AI model to the public pre-trained AI model comprises using one or more features of the public pre-trained AI model with the private AI model.

3. The computer-implemented method of claim 1, wherein the public pre-trained AI model is located on a public cloud.

4. The computer-implemented method of claim 1, wherein the public pre-trained AI model is trained with public data comprising first image data and the private AI model is trained with private data comprising second image data.

5. The computer-implemented method of claim 1, wherein the public pre-trained AI model is trained with public data comprising first speech data and the private AI model is trained with private data comprising second speech data.

6. The computer-implemented method of claim 1, wherein the public pre-trained AI model is trained with public data comprising first computer vision data and the private AI model is trained with private data comprising second computer vision data.

7. The computer-implemented method of claim 1, wherein the public pre-trained AI model is trained with public data comprising first language data and the private AI model is trained with private data comprising second language data.

8. The computer-implemented method of claim 1, wherein the public pre-trained AI model is trained with public data comprising first text data and the private AI model is trained with private data comprising second text data.

9. The computer-implemented method of claim 1, wherein the public pre-trained AI model is trained with public data comprising first audio data and the private AI model is trained with private data comprising second audio data.

10. The computer-implemented method of claim 1, wherein private AI model is smaller than the public pre-trained AI model, based on number of parameters.

11. The computer-implemented method of claim 1, wherein the computer implemented method further comprises:
linking, by an AI model training application, a private AI model to a first public pre-trained AI model to thereby form a first combined AI model comprising the private AI model and the first public pre-trained AI model;
training, by the AI model training application, the first combined AI model with first private samples while keeping the first public pre-trained AI model fixed so that only the private AI model is trained with the first private samples;
linking, by the AI model training application, the private AI model to a second public pre-trained AI model to thereby form a second combined AI model comprising the private AI model and the second public pre-trained AI model; and
training, by the AI model training application, the second combined AI model with second private samples while keeping the second public pre-trained AI model fixed so that only the private AI model is trained with the second private samples.

12. A computer program product comprising a computer readable storage medium having program instructions embodied therewith, the program instructions executable by one or more processors to cause the one or more processors to perform a method comprising:
linking, by an AI model training application, a private AI model, to a public pre-trained AI model to thereby form a combined fusion AI model comprising the private AI model and the public pre-trained AI model; and
training, by the AI model training application, the combined AI model with private samples while keeping the public pre-trained AI model fixed so that only the private AI model is trained with the private samples and feature tensor input from the public pre-trained AI model, wherein weights associated with the public AI model are not updated, allowing simultaneous training of a plurality of private AI models.

13. The computer program product of claim 12, wherein linking the private AI model to the public pre-trained AI model comprises using one or more features of the public AI model with the private AI model.

14. The computer program product of claim 12, wherein the public pre-trained AI model is located on a public cloud.

15. The computer program product of claim 12, wherein the public pre-trained AI model is trained with public data comprising first image data and the private AI model is trained with private data comprising second image data.

16. The computer program product of claim 12, wherein the public pre-trained AI model is trained with public data comprising first speech data and the private AI model is trained with private data comprising second speech data.

17. A system including one or more processors configured to implement a method comprising:
linking, by an AI model training application, a private AI model, to a public pre-trained AI model to thereby form a combined fusion AI model comprising the private AI model and the public pre-trained AI model; and
training, by the AI model training application, the combined AI model with private samples while keeping the public pre-trained AI model fixed so that only the private AI model is trained with the private samples and feature tensor input from the public pre-trained AI model, wherein weights associated with the public AI model are not updated, allowing simultaneous training of a plurality of private AI models.

18. The system of claim 17, wherein linking the private AI model to the public pre-trained AI model comprises using one or more features of the public AI model with the private AI model.

19. The system of claim 17, wherein the public pre-trained AI model is located on a public cloud.

20. The system of claim 17, wherein the public pre-trained AI model is trained with public data comprising first image data and the private AI model is trained with private data comprising second image data.

* * * * *